US010992711B2

(12) United States Patent
Hu et al.

(10) Patent No.: US 10,992,711 B2
(45) Date of Patent: Apr. 27, 2021

(54) NETWORK AWARE DATA DRIVEN INTERNET OF THINGS SERVICE ENGINE

(71) Applicant: AT&T INTELLECTUAL PROPERTY I, L.P., Atlanta, GA (US)

(72) Inventors: Qingmin Hu, Sammamish, WA (US); Douglas Eng, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 604 days.

(21) Appl. No.: 15/486,711

(22) Filed: Apr. 13, 2017

(65) Prior Publication Data
US 2018/0302440 A1  Oct. 18, 2018

(51) Int. Cl.
*G06F 21/31*  (2013.01)
*H04L 29/06*  (2006.01)
(Continued)

(52) U.S. Cl.
CPC .......... *H04L 63/20* (2013.01); *H04L 41/0893* (2013.01); *H04L 43/0817* (2013.01);
(Continued)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| 8,737,989 | B2 * | 5/2014 | Luft ...................... | H04W 4/70 455/432.3 |
| 9,113,448 | B2 * | 8/2015 | Charbit ................ | H04W 4/70 |

(Continued)

FOREIGN PATENT DOCUMENTS

| EP | 2911423 A1 | 8/2015 |
| WO | 2011112683 A1 | 9/2011 |

(Continued)

OTHER PUBLICATIONS

Belli et al. "A graph-based cloud architecture for big stream real-time applications in the internet of things." European Conference on Service-Oriented and Cloud Computing. Springer International Publishing, 2014. [http://citeseerx.ist.psu.edu/viewdoc/download?doi=10.1.1.696.4059&rep=rep1&type=pdf], retrieved on Jan. 31, 2017, 15 pages.

(Continued)

*Primary Examiner* — Sharif E Ullah
(74) *Attorney, Agent, or Firm* — Amin, Turocy & Watson, LLP

(57) ABSTRACT

A network aware data driven Internet of things (IoT) service engine is presented herein. A method can comprise receiving a policy rule from a network device of respective network devices—the policy rule corresponding to a sensor of a group of sensors that have been configured to transmit information of respective services to the respective network devices using an Internet protocol, and the policy rule defining an action to be performed by the system in response to a behavior of the sensor being determined to satisfy a defined condition specified by the policy rule with respect to a service of the respective services; based on the policy rule, monitoring the behavior of the sensor; and in response to determining that the behavior of the sensor satisfies the defined condition, performing the action on behalf of the network device.

20 Claims, 11 Drawing Sheets

(51) Int. Cl.
*H04L 29/08* (2006.01)
*H04W 4/38* (2018.01)
*H04W 12/00* (2021.01)
*H04L 12/24* (2006.01)
*H04L 12/26* (2006.01)
*H04W 4/70* (2018.01)

(52) U.S. Cl.
CPC ...... *H04L 63/1416* (2013.01); *H04L 63/1425* (2013.01); *H04L 63/1441* (2013.01); *H04L 67/12* (2013.01); *H04W 4/38* (2018.02); *H04W 12/0027* (2019.01); *H04W 4/70* (2018.02); *H04W 12/00502* (2019.01)

(56) References Cited

U.S. PATENT DOCUMENTS

| | | | |
|---|---|---|---|
| 9,143,548 B2* | 9/2015 | Foti | H04L 65/1016 |
| 9,509,334 B2* | 11/2016 | Kataoka | H03M 7/3084 |
| 9,516,449 B2* | 12/2016 | Lehane | H04W 4/70 |
| 9,582,662 B1* | 2/2017 | Messick | G06F 21/554 |
| 10,650,621 B1* | 5/2020 | King | G07C 5/0816 |
| 10,671,721 B1* | 6/2020 | Otvagin | G06F 21/577 |
| 2011/0199905 A1* | 8/2011 | Pinheiro | H04W 28/0215 370/235 |
| 2011/0213871 A1* | 9/2011 | DiGirolamo | H04L 67/12 709/223 |
| 2012/0117140 A1* | 5/2012 | Wang | H04W 4/70 709/201 |
| 2012/0203905 A1* | 8/2012 | Lee | H04W 4/70 709/225 |
| 2013/0181851 A1* | 7/2013 | Kataoka | H03M 5/02 341/52 |
| 2013/0203394 A1* | 8/2013 | Dong | H04W 4/00 455/414.1 |
| 2015/0185713 A1* | 7/2015 | Glickfield | G05B 15/02 700/44 |
| 2015/0254190 A1* | 9/2015 | Yang | G06F 9/44505 710/8 |
| 2015/0301521 A1* | 10/2015 | Byron | G01P 15/18 700/108 |
| 2015/0312311 A1* | 10/2015 | Subramanian | H04L 41/0246 709/223 |
| 2015/0350809 A1* | 12/2015 | Yang | H04W 4/38 455/418 |
| 2016/0007137 A1* | 1/2016 | Ahn | H04W 4/70 370/254 |
| 2016/0007138 A1* | 1/2016 | Palanisamy | H04W 4/70 455/41.2 |
| 2016/0085594 A1* | 3/2016 | Wang | H04L 67/12 709/226 |
| 2016/0192360 A1* | 6/2016 | Lee | H04W 4/70 370/336 |
| 2016/0232116 A1 | 8/2016 | Bone et al. | |
| 2016/0234686 A1* | 8/2016 | Bone | H04W 88/02 |
| 2016/0330278 A1* | 11/2016 | Katayama | H04L 67/2823 |
| 2017/0006135 A1* | 1/2017 | Siebel | H04L 67/02 |
| 2019/0268906 A1* | 8/2019 | Perdomo | H04W 72/0453 |

FOREIGN PATENT DOCUMENTS

| | | |
|---|---|---|
| WO | 2013082628 A2 | 6/2013 |
| WO | 2016200526 A1 | 12/2016 |

OTHER PUBLICATIONS

Poslad et al. "A Semantic IoT Early Warning System for Natural Environment Crisis Management." IEEE Transactions on Emerging Topics in Computing 3.2 (2015): 246-257. [http://ieeexplore.ieee.org/iel7/6245516/7118282/07109842.pdf]. Retrieved on Jan. 31, 2017, 12 pages.

Brill, "The Internet of Things: Building Trust and Maximizing Benefits Through Consumer Control." Fordham L. Rev. 83 (2014): 205. [http://ir.lawnet.fordham.edu/cgi/viewcontent.cgi?article=5023&context=flr]. Retrieved on Jan. 31, 2017, 14 pages.

Shah, "Big Data and the Internet of Things." Big Data Analysis: New Algorithms for a New Society. Springer International Publishing, 2016, 207-237. [https://arxiv.org/pdf/1503.07092]. Retrieved on Jan. 31, 2017, 33 pages.

Kitchin, "Getting smarter about smart cities: Improving data privacy and data security." Data Protection Unit, Department of the Taoiseach, Dublin, Ireland, (2016). [http://eprints.maynoothuniversity.ie/7242/1/Smart]. Retrieved on Jan. 31, 2017, 83 pages.

* cited by examiner

NETWORK AWARE DATA DRIVEN INTERNET OF THINGS SERVICE ENGINE

TECHNICAL FIELD

The subject disclosure generally relates to embodiments for a network aware data driven Internet of things (IoT) service engine.

BACKGROUND

With an exponential growth of Internet of things (IoT) and Machine-to-Machine (M2M) devices, real-time management of related resources has become difficult and complex. Consequently, conventional network technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
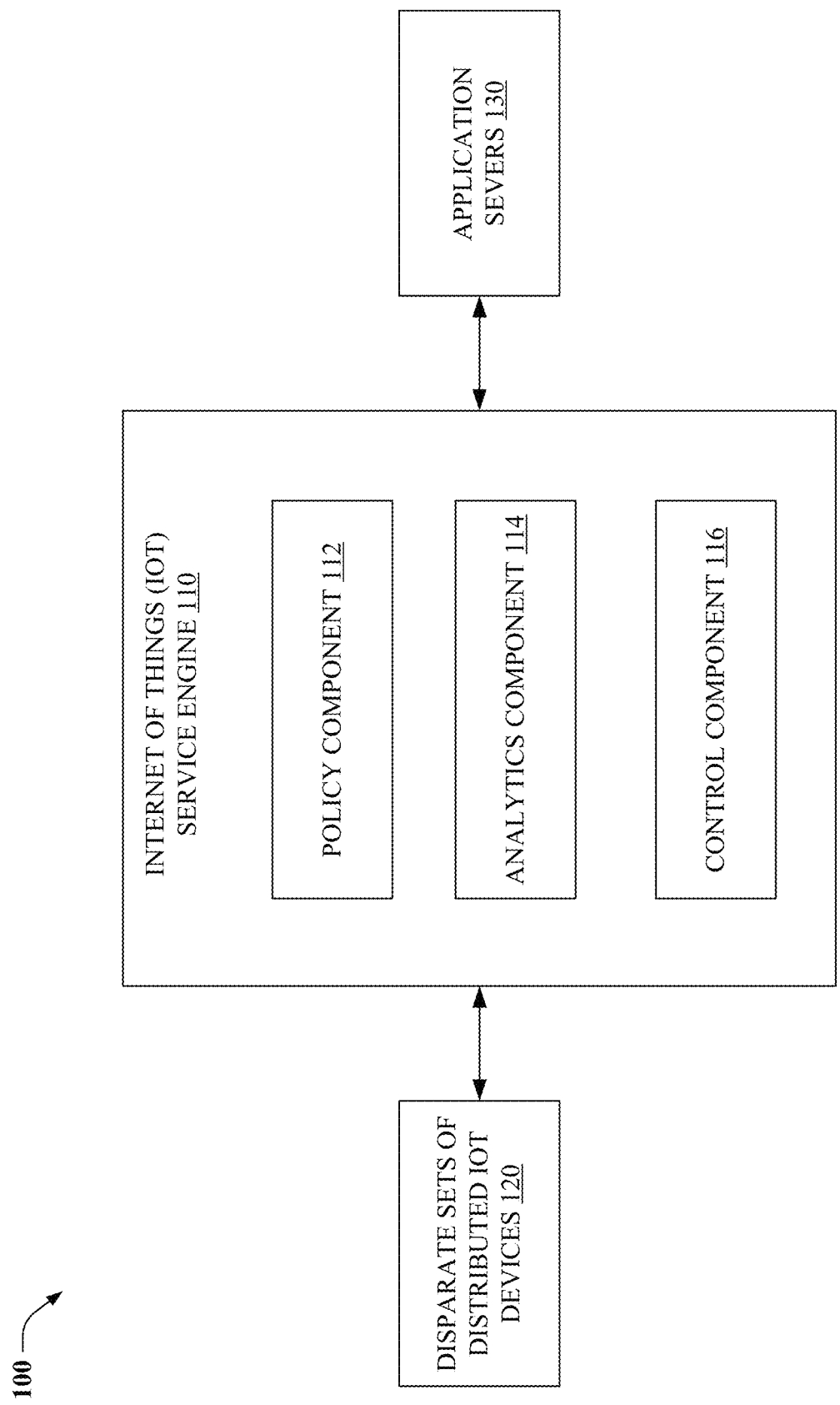
FIG. 1 illustrates a block diagram of a network aware data driven IoT communication environment, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional network technologies have had some drawbacks with respect to real-time management of resources within an IoT infrastructure. Various embodiments disclosed herein can improve customer experiences within an IoT ecosystem by performing real-time monitoring of network behavior of IoT devices, sensors, etc. and enforcing defined policies based on such behavior.

For example, a method can comprise receiving, by a system comprising a processor, e.g., an IoT service engine, a policy rule from a network device, e.g., an application server, of respective network devices. In this regard, the policy rule corresponds to a device, e.g., an IoT device, an M2M device, a sensor, a meter, etc. of a group of devices, IoT devices, sensors, etc. that have been configured to transmit information of respective services, e.g., a utility (e.g., water, gas, electric, etc.) service, a home automation service, a security service, a maintenance service, a fitness service, etc. to the respective network devices using an Internet protocol. Further, the policy rule defines an action to be performed by the IoT service engine in response to a behavior of the IoT device, sensor, etc. being determined, i.e., by the IoT service engine, to satisfy a defined condition specified by the policy rule with respect to a service of the respective services.

The method can further comprise monitoring, by the IoT service engine based on the policy rule, the behavior of the IoT device, sensor, etc.; and in response to determining that the behavior of the IoT device, sensor, etc. satisfies the defined condition, e.g., in response to determining that the IoT device, sensor, etc. is operating outside of a defined range of a default behavior with respect to the service, performing, by the IoT service engine, the action, e.g., on behalf of the network device, the service, etc.

In this regard, in one embodiment, the default behavior represents a defined frequency for the IoT device, sensor, etc. to transmit data periodically. In another embodiment, the default behavior represents a defined amount of the data to be transmitted by the IoT device, sensor, etc. during a transmission, period of time, etc.

In embodiment(s), the performing of the action comprises sending a notification message directed to the network device representing the behavior of the IoT device, sensor, etc. satisfies the defined condition. In other embodiment(s), the performing of the action comprises sending a control message directed to the IoT device, sensor, etc. to facilitate a change in operation of the IoT device, sensor, etc., e.g., disabling, suspending, powering down, etc. the IoT device, sensor, etc.

Another embodiment can comprise generating, by the IoT service engine, operational information representing the behavior; and based on the operational information, determining, by the IoT service engine, an expected behavior of the IoT device, sensor, etc. In this regard, in yet another embodiment, the defined condition represents a determination that the IoT device, sensor, etc. is operating outside of the expected behavior of the IoT device, sensor, etc.

In one embodiment, a system, e.g., an IoT service engine, can comprise a processor and a memory that stores executable instructions that, when executed by the processor, facilitate performance of operations, comprising: determining a behavior of an IoT device, sensor, etc. of a group of, e.g., IoT, M2M, etc. devices that have been configured to send, utilizing Internet protocol based communications, information to respective network devices, e.g., respective application servers—the IoT device, sensor, etc. configured to facilitate a performance of a service, e.g., utility, security, home automation, industrial, etc. corresponding to an application server of the respective application servers; and in response to determining that the behavior satisfies a defined condition that has been defined by a policy rule that also defines an action to be performed by the system upon a determination that the defined condition has been satisfied, performing the action.

In an embodiment, the operations can further comprise determining a defined behavior of the IoT device, sensor, etc. representing an average operating condition of the IoT device, sensor, etc. with respect to the service—the defined condition representing a determination that the behavior is different from the average operating condition. In another embodiment, the determining that the behavior satisfies the defined condition comprises determining that the IoT device, sensor, etc. is operating outside of a defined range of the average operating condition, e.g., the average operating condition comprising a defined period of time between data transmissions of the IoT device, sensor, etc., a defined frequency of data transmissions of the IoT device, sensor, etc., a defined amount of data to be included in a data transmission of the IoT device, sensor, etc., etc.

In embodiment(s), the performing action comprises initiating a change in operation, e.g., a power state, etc. of the IoT device, sensor, etc. In other embodiment(s), the performing the action comprises sending a message directed to the application server, e.g., notifying the application server that the action has been performed, notifying the application server that the IoT device, sensor, etc. is operating outside of the defined range of average operating condition, etc.

In one embodiment, a machine-readable storage medium can comprise executable instructions that, when executed by a processor of a device, e.g., an IoT service engine, facilitate performance of operations, comprising: based on a policy rule representing a defined condition of a behavior of an IoT device, sensor, etc. and representing a defined action to be performed according to the defined condition, monitoring an operation of the IoT device, sensor, etc.—the IoT device, sensor, etc. configured to transmit, utilizing an Internet protocol, information of a service to a network device, e.g., an application server; and in response to determining that the operation of the IoT device, sensor, etc. satisfies the defined condition, performing the defined action.

In another embodiment, the defined condition defines a maximum transmission amount of data that the IoT device, sensor, etc. has been configured to transmit during a transmission, and the determining comprises disabling the IoT device, sensor, etc. in response to determining that the IoT device, sensor, etc. has transmitted, during the transmission, an amount of data that is greater than the maximum transmission amount.

In yet another embodiment, the defined condition defines a maximum frequency of data transmissions of the IoT device, sensor, etc., and the determining comprises: in response to determining that the IoT device, sensor, etc. has transmitted data at a frequency that is greater than the maximum frequency, sending a message directed to the network device representing the IoT device, sensor, etc. has transmitted data at the frequency that is greater than the maximum frequency.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As mentioned above, connection oriented network technologies have had some drawbacks with respect to managing resources within a diverse, rapidly growing IoT ecosystem. Various embodiments disclosed herein can improve customer experiences by utilizing an IoT service engine to monitor network behavior of an IoT device, and enforce one or more defined policies corresponding to the IoT device based on such behavior.

Figure 2:
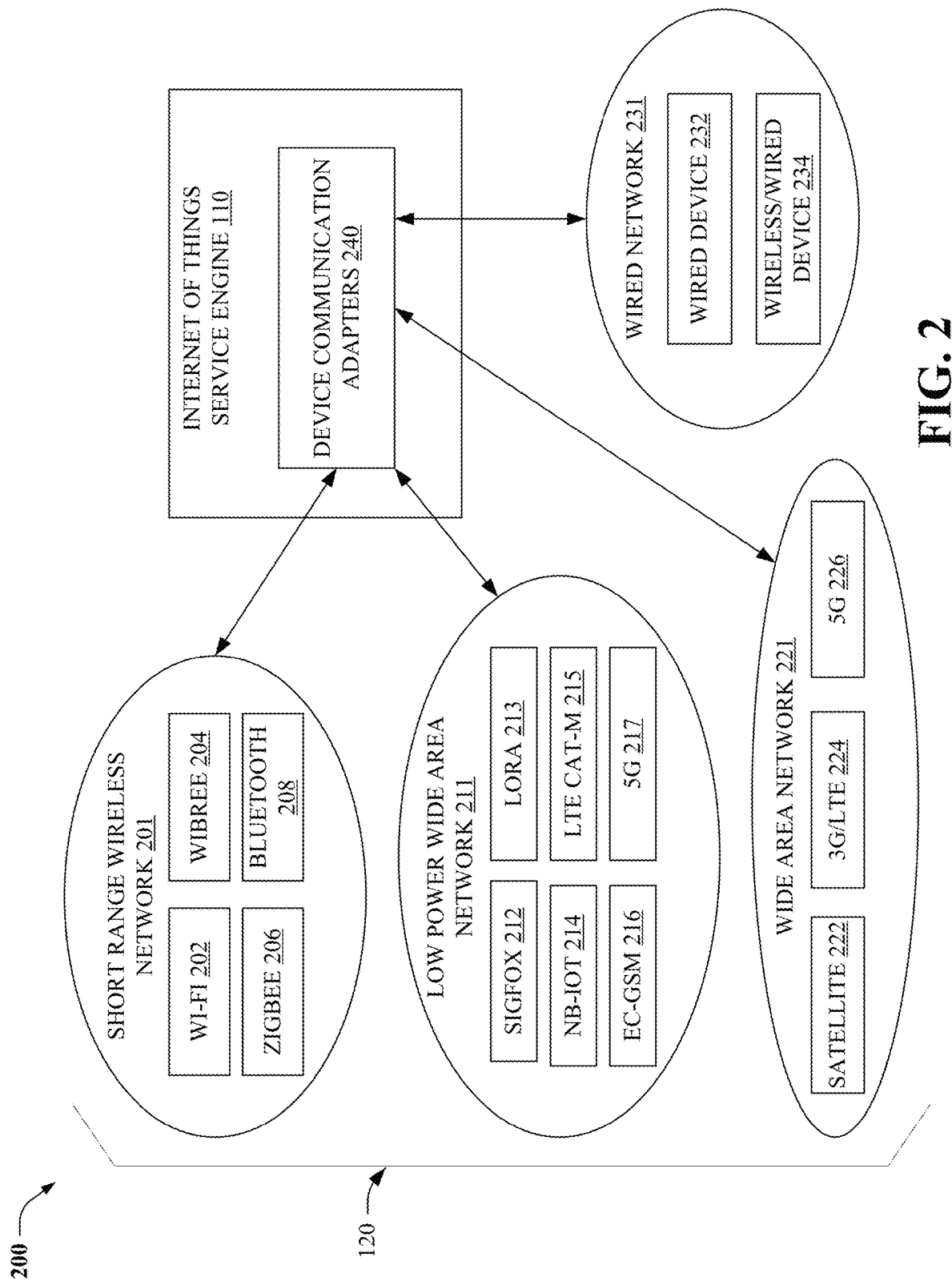
FIG. 2 illustrates a block diagram of disparate sets of distributed sensors within a network aware data driven IoT communication environment, in accordance with various example embodiments.

In this regard, and now referring to FIGS. 1 and 2, block diagrams of a network aware data driven IoT communication environment (100), and disparate sets of distributed IoT devices, sensors, etc. within such communication environment (200) are illustrated, in accordance with various example embodiments. In embodiment(s), IoT service engine 110 can be coupled to an IoT device, sensor, etc. (not shown) of disparate sets of distributed IoT devices 120 utilizing a wireless interface and/or a wired interface. The IoT device, sensor, etc. can comprise, e.g., a sensor, a meter, a utility (e.g., water, gas, electricity, etc.) meter, a radio frequency identification (RFID) device, a machine-to-machine (M2M) based device, a wireless and/or wired device, an appliance sensor, a security sensor, a motion sensor, a camera, a health monitor device, a fitness tracking device, a smartwatch, a home security system device, a thermostat, a smartphone, a laptop device, a tablet device, a television device, a vehicle device, a gaming console device, a user equipment (UE), a power and/or energy control device, an industrial control and/or monitoring device, etc.

As illustrated by FIG. 2, disparate sets of distributed IoT devices 120 can comprise IoT, sensor, etc. devices of respective networks comprising short range wireless network 201 (e.g., comprising Wi-Fi device 202, Wibree device 204, Zigbee device 206, and Bluetooth device 208); low power wide area network (LPWAN) 211 (e.g., comprising Sigfox device 212, e.g., based on ultra-narrow band (UNB) technology (e.g., utilizing unlicensed industrial, scientific, and medical (ISM) radio frequency band(s)), LoRa device 213 (e.g., utilizing chirp spread spectrum (CSS)), NarrowBand IoT (NB-IoT) device 214, long term evolution LTE Category M1 (LTE CAT-M) device 215, extended coverage global system for mobile communication IoT (EC-GSM-IoT) device 216, and fifth generation (5G) evolution of radio access technology device 217); wide area network (WAN) 221 (e.g., comprising satellite based device 222, third generation partnership project (3GPP) and/or LTE device 224, and 5G evolution of radio access technology device 226); and wired network 231 (e.g., comprising wired device 232 and wireless/wired device 234).

In one embodiment, the IoT device, sensor, etc. can be a uniquely identifiable embedded computing device, e.g., assigned a unique IP address, and exchange information and/or perform actions (e.g., remote monitoring, remote control, etc.) using information, network communications, data, etc. transferred, via IoT service engine 110, between the IoT device, sensor, etc. and respective applications of application servers 130.

In this regard, IoT service engine 110 can be coupled to the IoT device, sensor, etc. via the wireless and/or wired interface using an adapter (not shown) of device communication adapters 240 configured to transmit/receive information to/from the IoT device, sensor, etc. using respective wireless and/or wired technologies. In one embodiment, the adapter can be configured to translate, convert, etc. information received from the IoT device, sensor, etc. via the wireless and/or wired technologies into an Internet protocol (IP) based data packet. Further, the adapter can be configured to translate an IP based communication directed to the IoT device, sensor, etc. into an appropriate wireless and/or wired technology that is compatible with the wireless and/or wired interface coupling the IoT device, sensor, etc. to IoT service engine 110.

In embodiment(s), the wireless interface can comprise an over-the-air wireless link comprising a downlink (DL) and an uplink (UL) (both not shown) that can utilize a predetermined band of radio frequency (RF) spectrum associated with, e.g., cellular, LTE, LTE advanced (LTE-A), GSM, 3GPP universal mobile telecommunication system (UMTS), Institute of Electrical and Electronics Engineers (IEEE) 802.XX technology (WiFi, Bluetooth, etc.), worldwide interoperability for microwave access (WiMax), a wireless local area network (WLAN), Femto, near field communication (NFC), Wibree, Zigbee, satellite, WiFi Direct, etc. Accordingly, the IoT device, sensor, etc. can be associated with such predetermined radio frequency (RF) spectrum.

In this regard, the adapter can transmit/receive, via the wireless interface, information to/from the IoT device, sensor, etc. utilizing one or more: macro, Femto, or pico access points (APs) (not shown); base stations (BS) (not shown); landline networks (e.g., optical landline networks, electrical landline networks) (not shown) communicatively coupled between IoT service engine 110 and the IoT device, sensor, etc. In various embodiments, IoT service engine 110 can communicate with the IoT device, sensor, etc. via any number of various types of wireless technologies including, but not limited to, cellular, WiFi, WiMax, WLAN, Femto, NFC, Wibree, Zigbee, satellite, WiFi Direct, etc.

In other embodiment(s), the adapter can transmit/receive, via the wired interface, information to/from the IoT device, sensor, etc. utilizing one or more of the Internet (or another communication network (e.g., an Internet protocol (IP) based network)), or a digital subscriber line (DSL)-type or broadband network facilitated by Ethernet or other technology. In this regard, the network aware data driven IoT communication environment can comprise a cloud-based, centralized, communication platform, Internet platform, WAN, etc. (see, e.g., 1090 below), and component(s), portion(s), etc. of IoT service engine 110, e.g., device communication adapters 240, etc. can be implemented within the cloud-based, centralized, communication platform.

In embodiment(s), one or more adapters (not shown) of device communication adapters 240 can comprise a hub, wired hub, wireless hub, etc. that can be installed in a location, e.g., home, business, etc. remote from the cloud-based communication platform, etc., and such adapters can send/receive information to/from IoT service engine 110 via the Internet.

Referring now to FIG. 1, IoT service engine 110 can comprise policy component 112, analytics component 114, and control component 116. Policy component 112 can receive, via application servers 130, policy rules defining actions to be performed in response to respective conditions, device conditions, etc. being determined to have been met. In this regard, application servers 130 can be associated with services, e.g., a home automation service, a utility service, a security service, a maintenance service, a fitness service, etc.; and IoT service engine 110 can perform, based on the policy rules, centralized monitoring, control, access, etc. of respective IoT devices of disparate sets of distributed IoT devices 120 corresponding to the services.

In an embodiment, policy component 112 can receive, e.g., via interface component 430 (see below), a policy rule from an application server (not shown) of application servers 130 corresponding to a service of the services. In turn, policy component 112 can store the policy rule in a data store, storage component, etc. (e.g., 410) of IoT service engine 110.

In one embodiment, the policy rule can define a behavior, default behavior, expected behavior, etc. of an IoT device, sensor, etc. corresponding to the service, and further define an action for IoT service engine 110 to perform in response to IoT service engine determining that the IoT device, sensor, etc. has been operating differently from the behavior, default behavior, etc. that has been defined by the policy rule, e.g., that the IoT device, sensor, etc. has been behaving in an anomalous way. For example, the action can comprise a request for IoT service engine 110 to send a notification, message, etc. directed to the application server in response to a determination that the IoT device, sensor, etc. has been operating in the anomalous way. In another example, the action can comprise a request for IoT service engine 110 to control, alter an operation of, etc. the IoT device, sensor, etc. in response to the determination that the IoT device, sensor, etc. has been operating in the anomalous way, e.g., the request comprising a request that IoT service engine 110 disable the IoT device, sensor, etc., initiate a power down of the IoT device, sensor, etc., etc. in response to the determination that the IoT device, sensor, etc. has been operating in the anomalous way.

Figure 3:
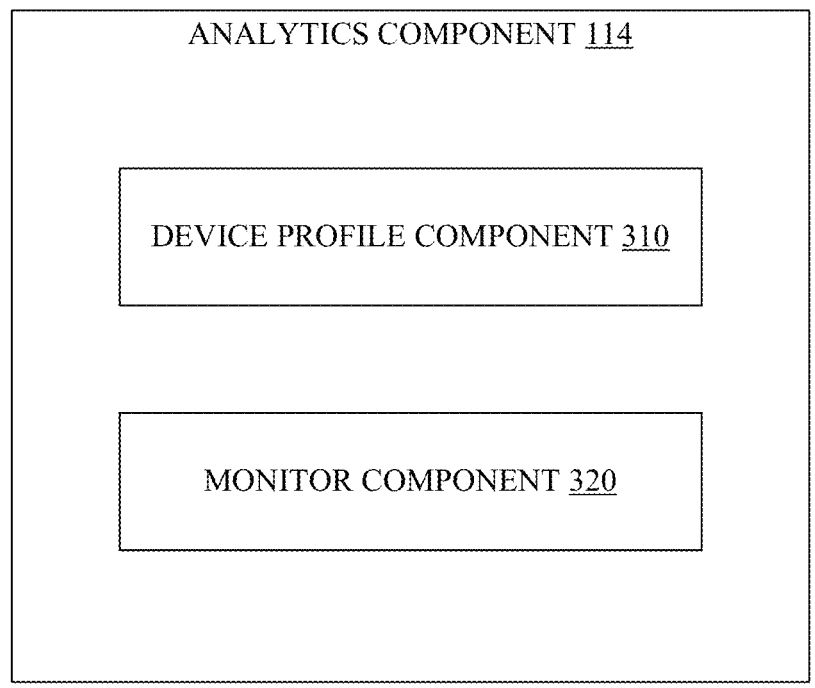
FIG. 3 illustrates a block diagram of an analytics component of an IoT service engine, in accordance with various example embodiments.
Figure 4:
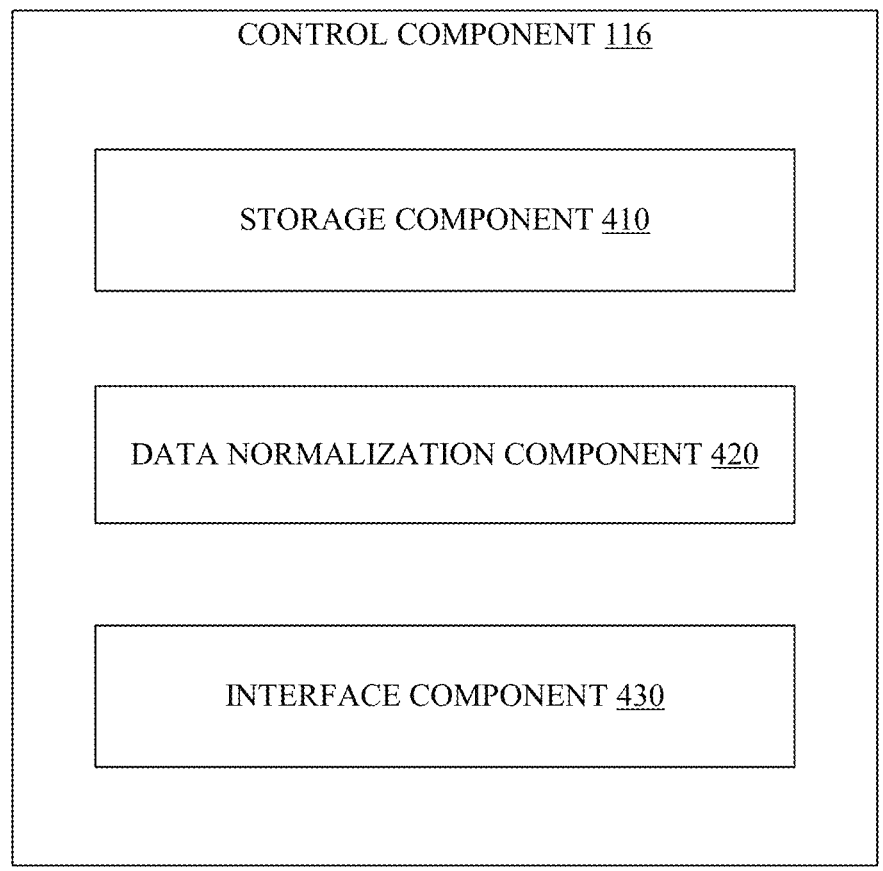
FIG. 4 illustrates a block diagram of a control component of an IoT service engine, in accordance with various example embodiments.

In this regard, and now referring to FIG. 3, analytics component 114 can comprise device profile component 310 and monitor component 320. Device profile component 310 can store, e.g., via a data store (e.g., storage component 410 (see below)), device configuration information, e.g., representing a type of the IoT device, sensor, etc., configuration parameters of the IoT device, sensor, etc., an IP address of the IoT device, sensor, etc., etc. Further device profile component 310 can store, via the data store, operational information, e.g., representing typical, average, expected, etc. operational characteristic(s), behavior(s), etc. of the IoT device, sensor, etc. during the service, e.g., representing a typical, average, expected, etc. period of time between transmissions of the service; representing a frequency, time, etc. of the transmissions; representing a typical, average, expected, etc. amount of data to be transmitted, received, etc. from the IoT device, sensor, etc., e.g., during the transmissions, etc.

In other embodiment(s), the operational information can represent a defined range of values, e.g., comprising an upper and lower limit, for the operational characteristic(s), behavior(s), etc. of the IoT device, sensor, etc. during the service, e.g., representing a range of expected periods of time between transmissions of the service; representing frequencies, times, etc. of the transmissions; representing a range of expected amounts of data to be transmitted, received, etc. from the IoT device, sensor, etc. during the transmissions, etc.

In one embodiment, the operational information can represent typical, average, expected, etc. operational characteristic(s), behavior(s) of a group IoT devices, sensors, etc. corresponding to the service, e.g., corresponding to a communication service provider, a home security service, a utility, etc. For example, in an embodiment, the operational information can represent a typical, average, expected, etc. number of IoT devices, sensors, etc. of the group of IoT devices, sensors, etc. to be active, e.g., transmitting information, during a period of time, etc.

In another embodiment, device profile component 310 can receive, e.g., via interface component 410 (see below), the device configuration information and/or the operational information from the application server. In turn, device profile component 310 can store the device configuration information and the operational information in the data store.

In yet another embodiment, device profile component 310 can derive, create, generate, etc. the operational information based on information, data, etc. observed, monitored, etc. via monitor component 320. In this regard, as described above, IoT service engine 110 facilitates a transfer of information, data, etc. from disparate sets of distributed IoT devices 120 to respective applications of application servers 130, e.g., utilizing respective IP addresses of such devices. In turn, monitor component 320 can observe, monitor, etc., e.g., in real-time, near real-time, a behavior of the IoT device, sensor, etc., e.g., comprising information, data, etc. transmitted by the IoT device, sensor, etc./received by IoT service engine 110.

In embodiment(s), the information, data, etc. can represent a type of a communication received from the IoT device, sensor, etc.; an amount of data being transmitted by/received from the IoT device, sensor, etc.; a time, a period of time, a frequency, etc. of the communication, related communications, etc.

In embodiment(s), analytics component 114 can determine whether the behavior of the IoT device, sensor, etc., e.g., the information, data, etc., satisfies a set of defined policy rules and/or conditions represented by the set of defined policy rules. In another embodiment(s), analytics component 114 can determine whether the behavior of the IoT device, sensor, etc., e.g., the information, data, etc. satisfies one, or a set of, defined operational information condition(s) represented by the operational information, e.g., whether the behavior of the IoT device, sensor, etc. is different from an expected, default, etc. behavior represented by the operational information.

In turn, in response to a determination that the behavior of the IoT device, sensor, etc., e.g., the information, data, etc. satisfies the set of defined policy rules, conditions represented by the set of defined policy rules, and/or the one, or the set of, defined operational information condition(s), analytics component 114 can initiate, perform, etc., via control component 116, action(s), e.g., defined by the set of defined policy rules and/or conditions represented by the set of defined policy rules, e.g., requesting further information from the IoT device, sensor, etc.; controlling, modifying, etc. an operation of the IoT device, sensor, etc., sending a message, notification, etc. to a corresponding application, service, etc. associated with the application servers 130, etc. In this regard, in embodiment(s), control component 116 can enforce a policy rule, or a condition represented by the policy rule, by initiating, performing, etc. the action(s) in a real-time, near real-time manner on behalf of respective applications, services, etc., e.g., facilitating optimized monitoring, control, management, of IoT devices within an IoT ecosystem.

For example, in an embodiment, a policy rule can define that IoT service engine 110 shut down, power down, disable a group of a defined number of distributed IoT devices (e.g., power meters) that have been configured to periodically, e.g., once per month, "wake-up" from a low power/suspended state to report data (e.g., electricity consumption) if IoT service engine 110 has detected a condition representing that the group of the defined number of distributed IoT devices woke up, reported data, etc. in a defined anomalous way, e.g., at the same time, a similar time, on the same day, etc.

In one embodiment, the policy rule can define that IoT service engine 110 shut down, power down, disable, etc. an IoT device, sensor, etc. that has been configured to periodically transmit less than 10 kilobytes (kB) of data if IoT service engine 110 had detected a condition representing that the IoT device, sensor, etc. has transmitted a defined anomalously large amount of data, e.g., greater than ten times an expected amount of data, e.g., 50 kB, 100 kB, 1 megabyte (MB), etc.

In another embodiment, the policy rule can define that after IoT service engine 110 has performed an action, IoT service engine 110 send a message, notification, etc.—representing that the action has been performed—to a corresponding application, service, etc.

In yet another embodiment, the policy rule can define that IoT service engine 110 obtain, query, etc. status information from the IoT device, sensor, etc. in response to a determination that the behavior, information, data, etc. satisfies the defined condition represented by the policy rule, e.g., that data has been corrupted, etc In an embodiment, the policy rule can define that IoT service engine 110 send a message, notification, etc. to a corresponding application, service, etc.—the message representing that an associated IoT device, sensor, etc. has not sent, transmitted, etc. information, data, etc. to IoT service engine 110 according to a defined frequency, interval of time, etc.

In an embodiment, the policy rule can define that IoT service engine 110 send a message, notification, etc. representing that IoT service engine 110 has determined that the behavior, information, data, etc. satisfies the defined condition represented by the policy rule. In turn, IoT service engine 110 can anticipate receiving, e.g., via interface component 430, an instruction, request, etc. from the corresponding application, service, etc., e.g., defining an action to be performed on the IoT device, sensor, etc.

In this regard, control component 116 can store at least portion(s) of the information, data, etc. in storage component 410, e.g., to facilitate retrieval of the portion(s) by the corresponding application, service, etc. after the corresponding application, service, etc. receives the message, notification, etc. from IoT service engine 110.

In one embodiment, control component 116 can determine, e.g., periodically, whether the portion(s) have been retrieved by the corresponding application, service, etc. In turn, in response to determining that the information, data, etc. has not been retrieved, accessed, etc., control component 116 can send, via interface component 430, a message to the corresponding application, service, etc. indicating that the portion(s) have not been retrieved, accessed, etc.

In embodiment(s), data normalization component 420 can normalize, convert, transform, etc. data received from the IoT device, sensor, etc. with respect to units of measurement defined by the policy rule. For example, data normalization component 420 can normalize, convert, transform, etc. data received from monitoring IoT devices, sensors, etc. into common units as defined by the policy rule, e.g., convert temperature data from Celsius to Fahrenheit/Fahrenheit to Celsius, convert data from Metric units to Imperial units/Imperial units to Metric units, etc.

Figure 5:
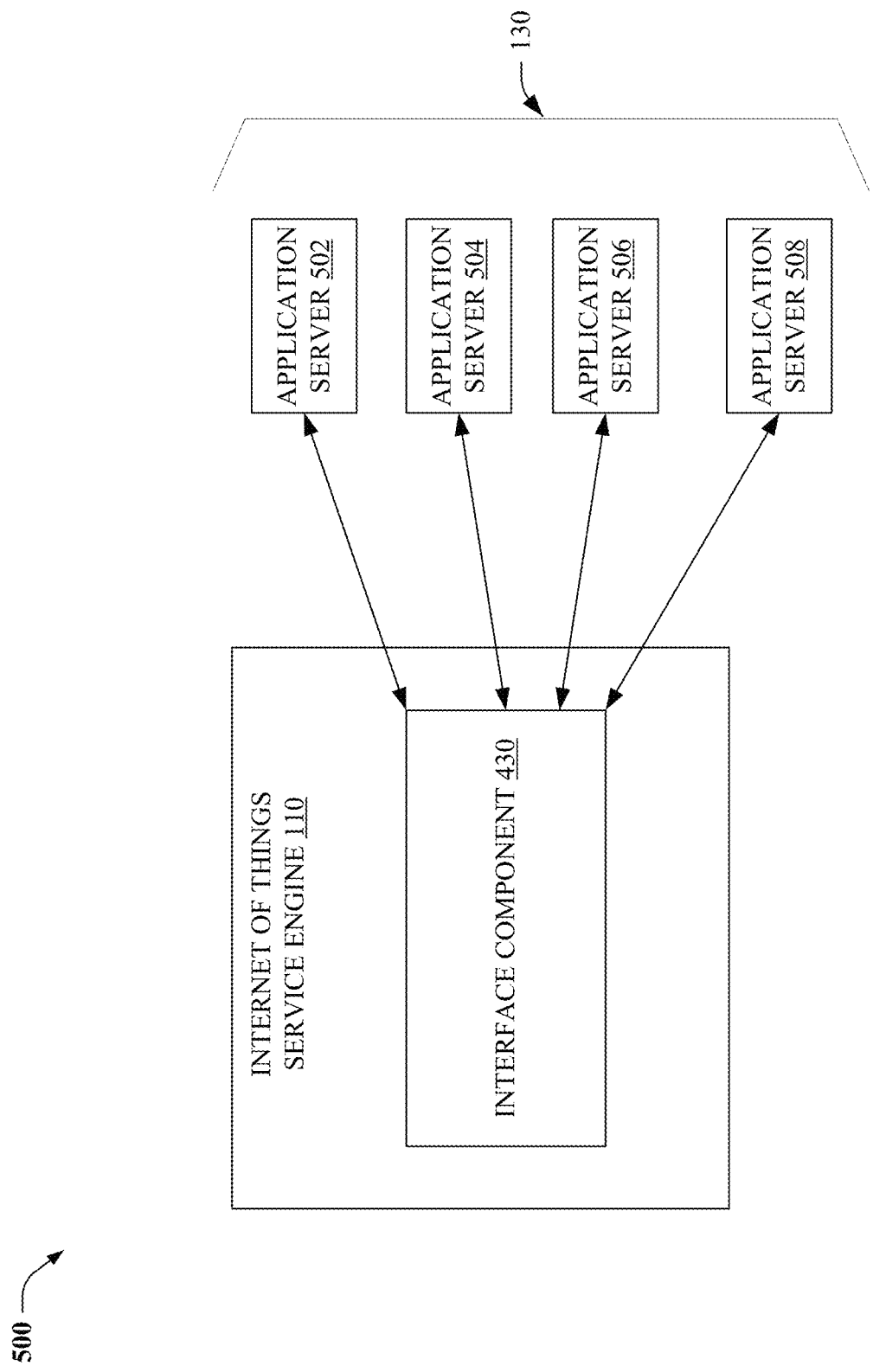
FIG. 5 illustrates a block diagram of application servers within a network aware data driven IoT communication environment, in accordance with various example embodiments.
Figure 6:
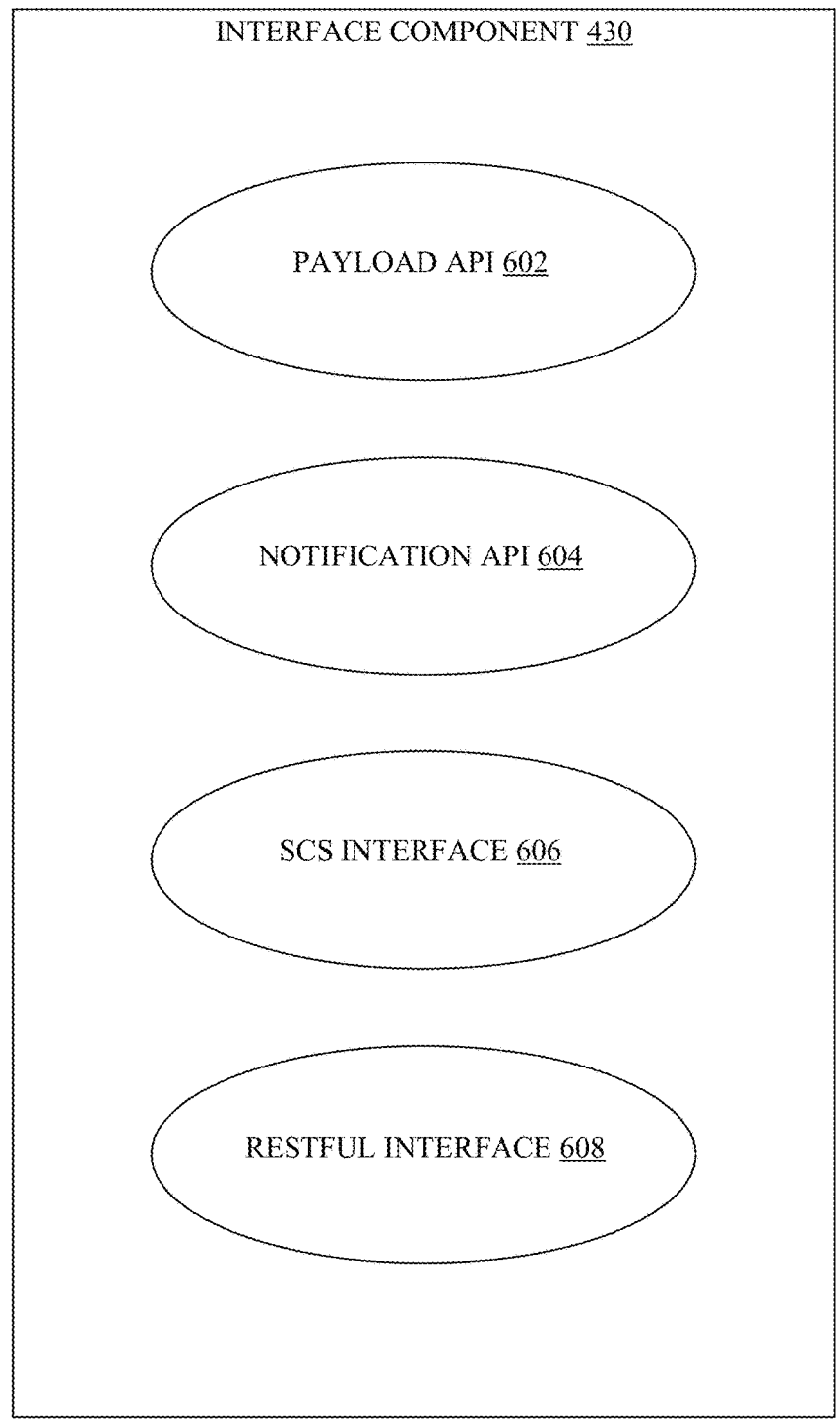
FIG. 6 illustrates a block diagram of an interface component of an IoT service engine, in accordance with various example embodiments.

Now referring to FIGS. 5-6, respective applications, services, etc. of application servers 130 (502, 504, 506, 508) can send/receive data to/from disparate sets of distributed IoT devices 120 using payload application programming interface (API) 602, notification API 604, service capability server (SCS) interface 606, and/or representational state transfer (REST/RESTful) interface 608.

In this regard, in one embodiment, the respective applications, services, etc. can receive information, data, etc. from respective IoT devices, sensors, etc. of disparate sets of distributed IoT devices 120 utilizing payload API 602. In another embodiment, the respective applications, services, etc. can receive notifications from IoT service engine 110 using notification API 604. In yet another embodiment, the respective applications, services, etc. can send/receive text messages comprising information, data, etc. to/from the respective IoT devices, sensors, etc. utilizing SCS interface 606. In an embodiment, the respective applications, services, etc. can send/receive hypertext markup language (HTML) based messages comprising information, data, etc. to/from the respective IoT devices, sensors, etc. utilizing REST/RESTful interface 608.

Figure 7:
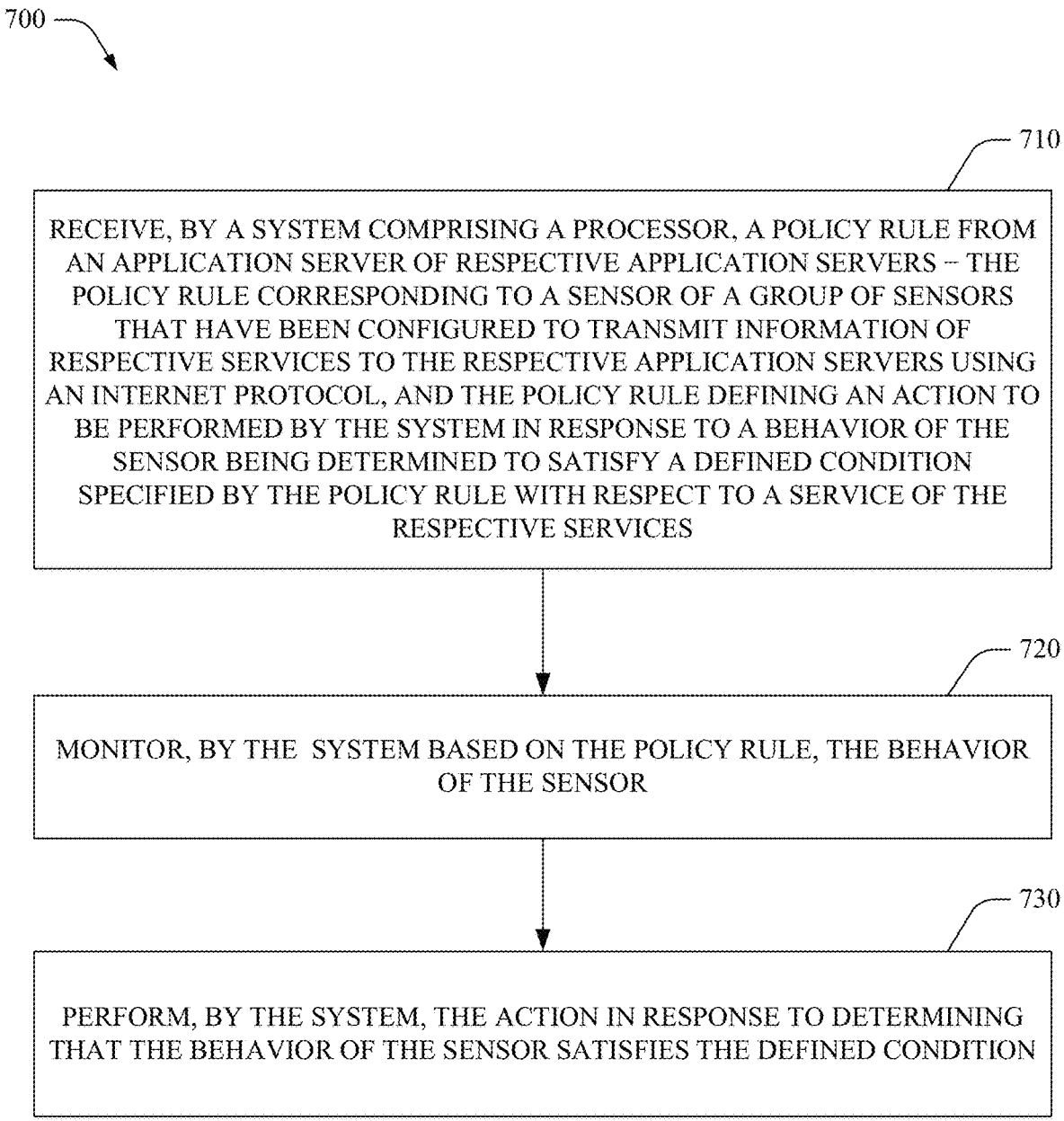
FIGS. 7-9 illustrate flowcharts of methods associated with a network aware data driven IoT communication environment, in accordance with various example embodiments.
Figure 8:
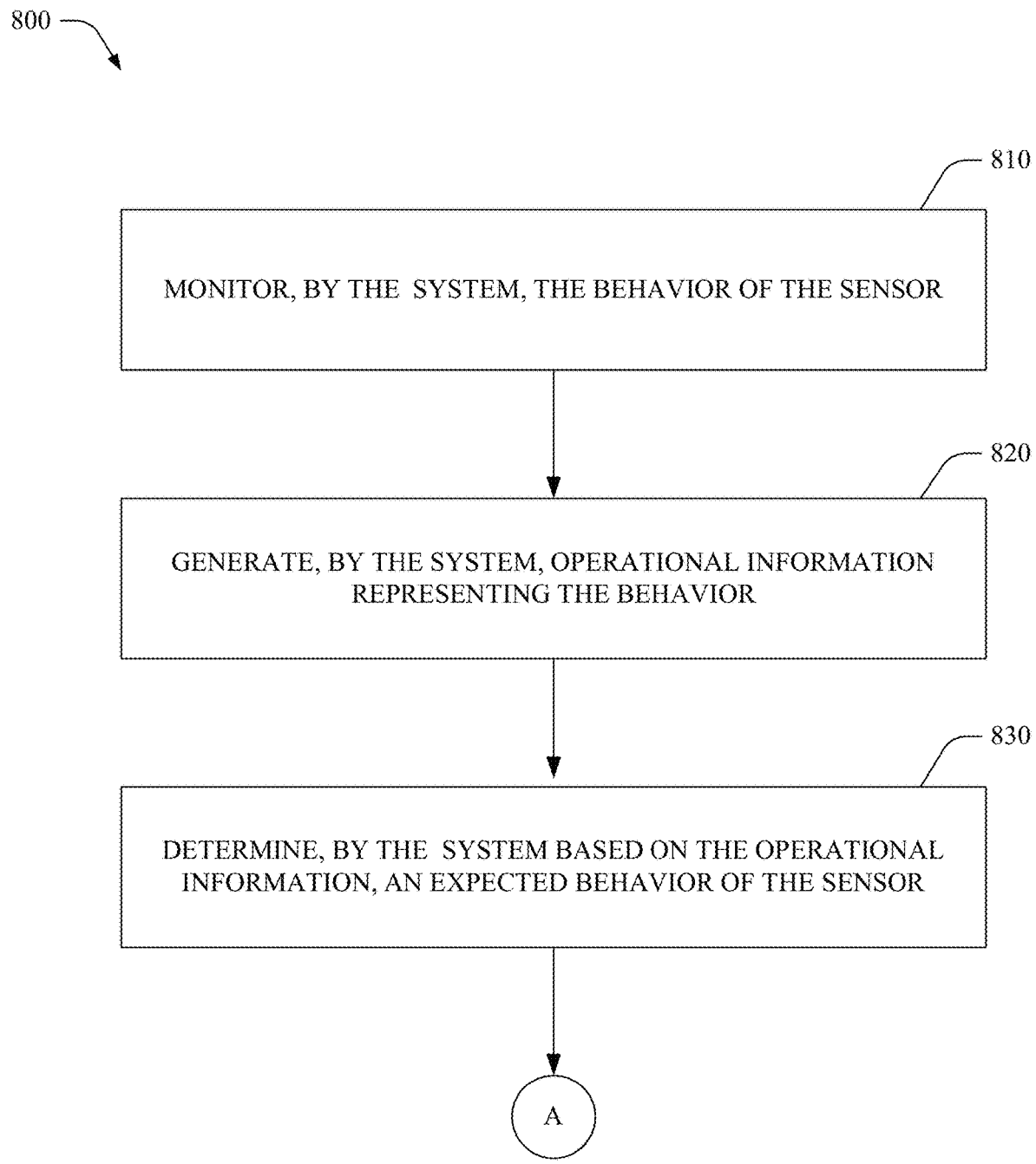
Figure 9:
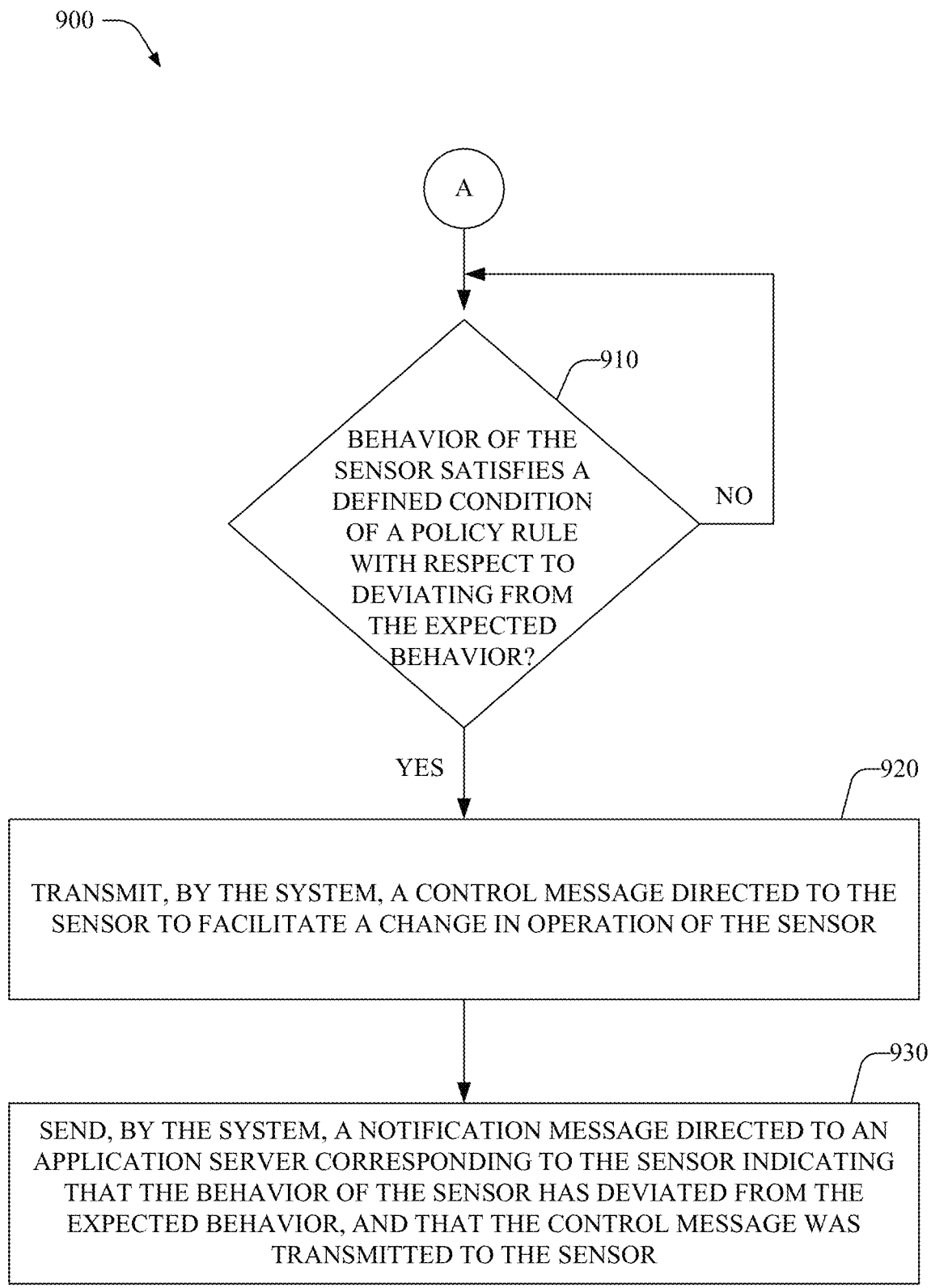

FIGS. 7-9 illustrate methodologies in accordance with the disclosed subject matter. For simplicity of explanation, the methodologies are depicted and described as a series of acts, e.g., governed by policies, conditions represented by the policies, etc. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, process 700 performed by IoT service engine 110 is illustrated, in accordance with various example embodiments. At 710, IoT service engine 110 can receive, e.g., via interface component 430, a policy rule from an application server (e.g., 502, 504, 506, 508, etc.) of respective application servers (130). In this regard, the policy rule corresponds to an IoT device, sensor, etc. of a group of IoT devices, sensors, etc. (e.g., 120) that have been configured to transmit information, data, etc. of respective services to the respective application servers using an IP, an IP based communication, etc. Further, the policy rule can define an action to be performed by IoT service engine 110, e.g., reconfigure the IoT device, sensor, etc., disable the IoT device, sensor, etc., notify a corresponding application server, etc. in response to a behavior of the IoT device, sensor, etc. being determined to satisfy a defined condition specified by the policy rule with respect to a service of the respective services, e.g., the defined condition specifying that the IoT device, sensor, etc. is operating outside of defined operating limits corresponding to the service.

At 720, IoT service engine 110 can monitor the behavior of the IoT device, sensor, etc., and at 730, IoT service engine 110 can perform the action in response to determining that the behavior of the IoT device, sensor, etc. satisfies the defined condition, e.g., that the IoT device, sensor, etc. is operating outside of the defined operating limits corresponding to the service.

Referring now to FIGS. 8-9, processes 800 to 900 performed by IoT service engine 110 are illustrated, in accordance with various example embodiments. At 810, IoT service engine 110 can monitor the behavior of the IoT device, sensor, etc. At 820, IoT service engine 110 can generate operational information representing the behavior. At 830, IoT service engine 110 can determine, based on the operational information, an expected behavior of the IoT device, sensor, etc., e.g., an expected range of an amount of data to be transmitted by the IoT device, sensor, etc. during the service, an expected range of a period of time that the IoT device, sensor, etc. transmits data, e.g., once per month, etc.

Flow continues from 830 to 910, at which IoT service engine 110 can determine whether the behavior of the IoT device, sensor, etc. satisfies a defined condition of a policy rule with respect to deviating from the expected behavior. In this regard, if IoT service engine 110 determines that the behavior of the IoT device, sensor, etc. satisfies the defined condition with respect to deviating from the expected behavior, flow continues to 920, at which IoT service engine 110 can transmit, send, etc. a control message, command, etc. directed to the IoT device, sensor, etc. to facilitate a change in operation of the IoT device, sensor, etc., e.g., to power down the IoT device, sensor, etc., change a configuration of the IoT device, sensor, etc., disable the IoT device, sensor, etc., etc.; otherwise flow returns to 910.

At 930, IoT service engine 110 can send a notification message directed to an application server corresponding to the IoT device, sensor, etc. indicating that the behavior of the IoT device, sensor, etc. has deviated from the expected behavior, and that the control message was transmitted to the IoT device, sensor, etc.

Figure 10:
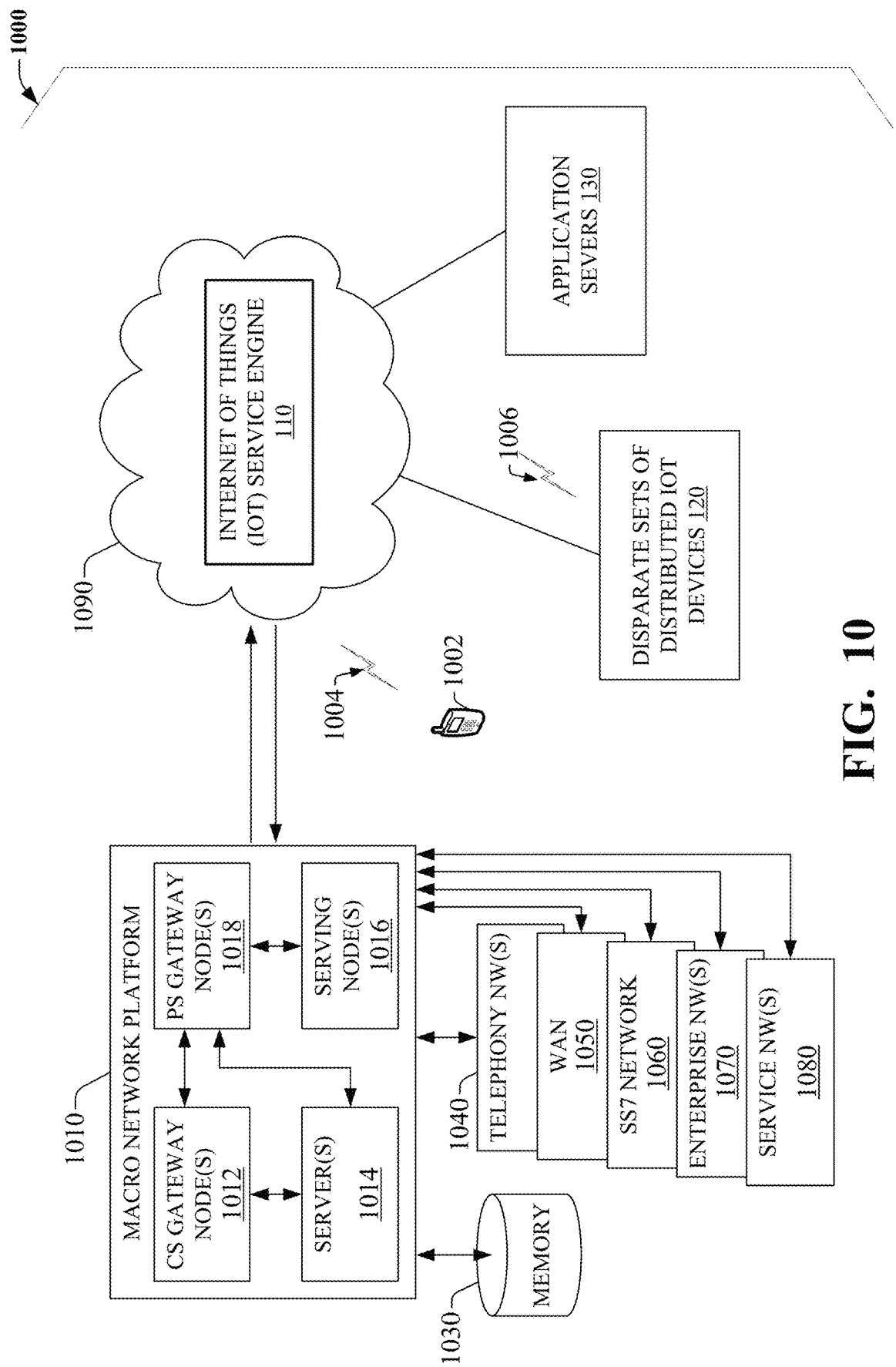
FIG. 10 illustrates a block diagram of a wireless network environment, in accordance various example embodiments.

With respect to FIG. 10, a wireless communication environment 1000 including macro network platform 1010 is illustrated, in accordance with various embodiments. Macro network platform 1010 serves or facilitates communication with an IoT device, sensor, wireless device, e.g., UE 1002, wired device, disparate sets of distributed IoT devices 120, application servers 130, etc. via radio network 1090. It should be appreciated that in cellular wireless technologies, e.g., 3GPP UMTS, high speed packet access (HSPA), 3GPP LTE, third generation partnership project 2 (3GPP2), ultra mobile broadband (UMB), LTE-A, etc. that can be associated with radio network 1090, macro network platform 1010 can be embodied in a core network. It is noted that radio network 1090 can include base station(s), base transceiver station(s), access point(s), etc. and associated electronic circuitry and deployment site(s), in addition to a wireless radio link operated in accordance with the base station(s), etc. Accordingly, radio network 1090 can comprise various coverage cells, or wireless coverage areas. In addition, it should be appreciated that elements and/or components of IoT service engine 110 can be located/included within one or more components/elements, e.g., hardware, software, etc., of wireless communication environment 1000, e.g., macro network platform 1010, radio network 1090, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via IoT service engine 110. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signalling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via radio network 1090, with served devices, communication devices, etc. Such data sessions can include traffic exchange with networks external to the macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of IoT service engine 110, disparate sets of distributed IoT devices 120, application servers 130, etc. The information can include business data associated with subscribers; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via radio network 1090; and so forth. Memory 1030 can also store information from at least one of telephony network(s) 1040, WAN 1050, SS7 network 1060, enterprise NW(s) 1070, or service NW(s) 1080.

In one or more embodiments, components of core network environment 1000 can provide communication services, e.g., via IoT service engine 110, to UE 1002, disparate sets of distributed IoT devices 120, and application servers 130 via radio network 1090 utilizing an over-the-air wireless link, e.g., 1002, 1006, etc. In this regard, radio network 1090 can include one or more: macro, Femto, or pico access points (APs) (not shown); base stations (BS) (not shown); landline networks (e.g., optical landline networks, electrical landline networks) (not shown) communicatively coupled between UE 1002, disparate sets of distributed IoT devices 120, and application servers 130 and macro network platform 1010. Further, over-the-air wireless link 1015 can comprise a downlink (DL) and an uplink (UL) (both not shown) that can utilize a predetermined band of radio frequency (RF) spectrum associated with any number of various types of wireless technologies including, but not limited to, cellular, LTE, LTE-A, GSM, 3GPP UMTS, Wi-Fi, WiMax, wireless local area networks (WLAN), Femto, etc.

Core network environment 1000 can include one or more of the Internet (or another communication network (e.g., IP-based network)), or a digital subscriber line (DSL)-type or broadband network facilitated by Ethernet or other technology. In various embodiments, core network environment 1000 can include hardware and/or software for allocating resources to UE 1002, disparate sets of distributed IoT devices 120, and application servers 130, converting or enforcing protocols, establishing and/or providing levels of quality of service (QoS), providing applications or services, translating signals, and/or performing other desired functions to facilitate system interoperability and communication to/from UE 1002, disparate sets of distributed IoT devices 120, and application servers 130.

In other embodiment(s), core network environment 1000 can include data store component(s), a memory configured to store information, computer-readable storage media storing computer-executable instructions, e.g., memory 1030, etc. enabling various operations performed via IoT service engine 110 as described herein. In this regard, core network environment 1000 can include data store component(s) associated with policy component 112, for storing policy data, condition(s), action(s), etc. representing policy rules for triggering, initiating, etc. respective actions by IoT service engine 110 as described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "memory storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
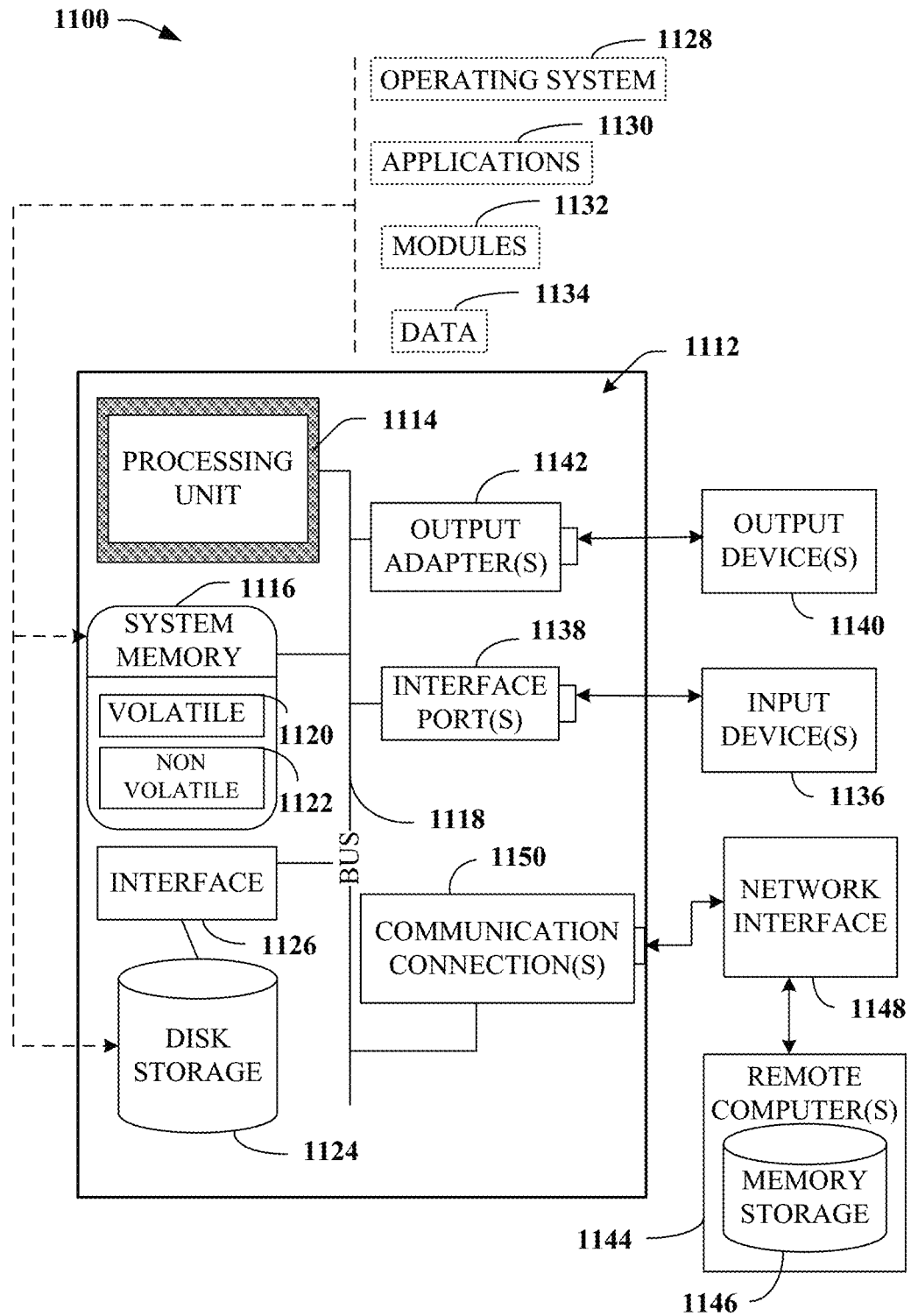
FIG. 11 is a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 include, for example, a serial port, a parallel port, a game port, a universal serial bus (USB), a wireless based port, e.g., WiFi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 include, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit switching networks like integrated services digital networks (e.g., ISDN) and variations thereon, packet switching networks, and digital subscriber lines (DSL).

Communication connection(s) 1150 refer(s) to hardware/ software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a network aware data driven IoT communication environment (see e.g., 100, 200, etc.), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, UE 1002, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, an IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module. Thus, the classifier(s) can be used by an artificial intelligence system to automatically learn and perform a number of functions, e.g., performed by IoT service engine 110, including but not limited to determining that a behavior of an IoT device, sensor, etc. satisfies a defined condition specified by a policy rule; generating operational information representing a behavior of an IoT device, sensor, etc. corresponding to a successful execution of a service, determining, based on the operational information, an expected, average, etc. behavior of the IoT device, sensor, etc.; and determining whether the IoT device, sensor, etc. operates outside of the expected, average, etc. behavior, e.g., outside of a permitted range of the expected, average, etc. behavior.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a system comprising a processor, a policy rule from network equipment of respective network equipment, wherein the policy rule corresponds to a sensor of a group of sensors that have been configured to transmit information of respective services to the respective network equipment using an Internet protocol, and wherein the policy rule defines an action to be performed by the system in response to a behavior of the sensor being determined to satisfy a defined condition of a group of defined conditions that has been specified by the policy rule with respect to a service of the respective services, wherein the group of defined conditions comprises a sensor transmission condition representing a defined maximum frequency of data transmissions of the sensor;

based on the policy rule, monitoring, by the system, the behavior of the sensor;

in response to operational information representing a defined range of an amount of data to be communicated via the sensor being monitored, storing, by the system, the operational information representing the defined range of the amount of data to be communicated via the sensor as stored data range information;

using the stored data range information, and in response to the sensor being determined, by the system based on the policy rule, to have transmitted or received a communicated amount of data that is outside of the defined range of the amount of data to be communicated via the sensor, disabling the sensor; and in response to determining, based on the policy rule, that a frequency of the data transmissions is greater than the defined maximum frequency of data transmissions of the sensor, sending, by the system, a notification message directed to the network equipment indicating that the behavior of the sensor has deviated from a default behavior of the sensor with respect to the service, and sending, by the system, a control message to the sensor to facilitate a reduction in an amount of data to be transmitted by the sensor, wherein the sensor comprises an Internet of things device.

2. The method of claim 1, wherein the policy rule defines the default behavior of the sensor with respect to the service, and wherein the defined condition represents a determination that the behavior is different from the default behavior.

3. The method of claim 2, wherein the operations further comprise:
determining whether the sensor is operating outside of a defined behavior range of the default behavior.

4. The method of claim 2, wherein the default behavior represents a defined amount of the data to be transmitted by the sensor during a period of time.

5. The method of claim 1, wherein the operations further comprise:
sending a notification message directed to the network equipment representing that the behavior of the sensor satisfies the defined condition.

6. The method of claim 1, wherein the control message is a first control message, and wherein the operations further comprise:
sending a second control message directed to the Internet of things device to facilitate a change in operation of the Internet of things device.

7. A system, comprising:
a processor; and
a memory that stores executable instructions that, when executed by the processor, facilitate performance of operations, comprising:
in response to receiving a policy rule specifying a defined condition of a group of defined conditions and representing a defined action to be performed in response to a behavior of an Internet of things device being determined to satisfy the defined condition, monitoring an operation of the Internet of things device according to the policy rule, wherein the Internet of things device has been configured to transmit, utilizing an Internet protocol, information of a service to network equipment, and wherein the group of defined conditions comprises a data transmission condition representing a maximum rate of data transmissions of the Internet of things device;
in response to a defined range of an amount of data to be communicated via the Internet of things device being monitored, storing the defined range of the amount of data to be communicated via the Internet of things device as stored data;
based on the policy rule and the stored data, and in response to the Internet of things device being determined to have transmitted a communicated amount of data that is outside of the defined range of the amount of data to be communicated via the Internet of things device, disabling the Internet of things device; and
based on the policy rule, in response to a rate of the data transmissions being determined to be greater than the maximum rate of data transmissions,
sending a first message directed to the network equipment indicating that the behavior of the Internet of things device has deviated from an expected behavior of the Internet of things device, and
sending a second message directed to the Internet of things device to facilitate a reduction in a rate of data transfer between the Internet of things device and the network equipment.

8. The system of claim 7, wherein the operations further comprise:
determining a defined behavior of the Internet of things device representing an average operating condition of the Internet of things device with respect to the service, and wherein the defined condition represents a determination that the behavior is different from the average operating condition.

9. The system of claim 8, wherein determining that the behavior satisfies the defined condition comprises determining that the Internet of things device is operating outside of a defined range of the average operating condition.

10. The system of claim 8, wherein the average operating condition comprises a defined period of time between the data transmissions of the Internet of things device.

11. The system of claim 8, wherein the average operating condition comprises a defined frequency of the data transmissions of the Internet of things device.

12. The system of claim 8, wherein the average operating condition comprises the defined range of the amount of data to be communicated via the Internet of things device.

13. The system of claim 7, wherein performing the defined action comprises initiating a change in operation of the Internet of things device.

14. The system of claim 7, where performing the defined action comprises sending a notification message directed to the network equipment.

15. A machine-readable medium, comprising executable instructions that, when executed by a processor, facilitate performance of operations, comprising:
based on a policy rule representing a defined condition of a group of defined conditions of a behavior of an Internet of things device and further representing a defined action to be performed according to the defined condition, monitoring an operation of the Internet of things device, wherein the Internet of things device has been configured to transmit, utilizing an Internet protocol, information of a service to a network equipment, and wherein the group of defined conditions comprises an Internet of things device transmission frequency condition;
in response to a defined range of an amount of data to be communicated via the Internet of things device being monitored, storing the defined range of the amount of data to be communicated via the Internet of things device;
in response to determining that the Internet of things device has received a received amount of data that is outside of the defined range of the amount of data to be communicated via the Internet of things device, disabling the Internet of things device; and
in response to determining that the Internet of things device has transmitted data at a frequency that is greater than a maximum frequency of data transmissions of the Internet of things device,
sending a first message directed to the network equipment indicating that the behavior of the Internet of things device has deviated from an expected behavior of the Internet of things device, and
sending a second message directed to the Internet of things device to facilitate a reduction in an amount of data to be transmitted to the network equipment.

16. The machine-readable medium of claim 15, wherein the defined condition defines a maximum transmission amount of data that the Internet of things device has been configured to transmit during a transmission, and wherein the operations further comprise:
in response to determining that the Internet of things device has transmitted, during the transmission, an amount of data that is greater than the maximum transmission amount, disabling the Internet of things device.

17. The machine-readable medium of claim 15, wherein the defined condition comprises the Internet of things device transmission frequency condition, and wherein the Internet of things device transmission frequency condition defines the maximum frequency of data transmissions of the Internet of things device.

18. The system of claim 7, wherein the operations further comprise:
sending a notification message directed to the network equipment representing that the behavior of the Internet of things device satisfies the defined condition.

19. The system of claim 7, wherein the operations further comprise:
sending a control message directed to the Internet of things device to facilitate a change in operation of the Internet of things device.

20. The machine-readable medium of claim 15, wherein the operations further comprise:
sending a control message directed to the Internet of things device to facilitate a change in operation the Internet of things device.

\* \* \* \* \*